Dec. 1, 1953 S. A. GORDON ET AL 2,661,203
SHOCK ABSORBING DRAG STRUT FOR AIRCRAFT LANDING GEARS
Filed June 29, 1950 2 Sheets-Sheet 1

INVENTORS
SAMUEL A. GORDON,
MELVIN P. ESPY,
CONRAD H. COOKE,
MAURICE G. GERTEL,
BY Martin E. Hogan Jr.
ATTORNEY Dec. 1, 1953     S. A. GORDON ET AL     2,661,203
SHOCK ABSORBING DRAG STRUT FOR AIRCRAFT LANDING GEARS
Filed June 29, 1950     2 Sheets-Sheet 2
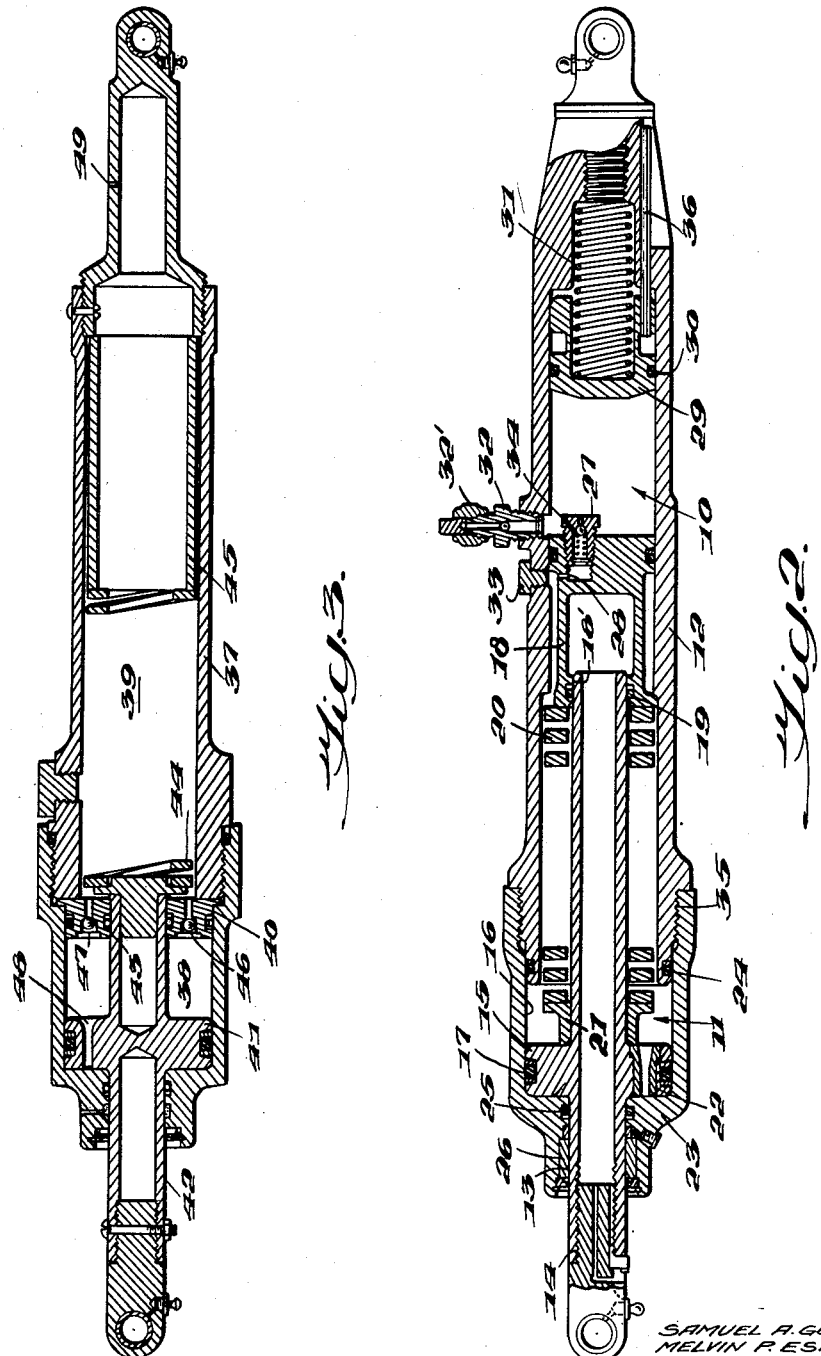
INVENTORS
SAMUEL A. GORDON,
MELVIN P. ESPY,
CONRAD H. COOKE,
MAURICE G. GERTEL,
BY
ATTORNEY Patented Dec. 1, 1953

2,661,203

UNITED STATES PATENT OFFICE 2,661,203

SHOCK ABSORBING DRAG STRUT FOR AIRCRAFT LANDING GEARS

Samuel A. Gordon, Baltimore, and Melvin P. Espy and Conrad H. Cooke, Baltimore County, Md., and Maurice G. Gertel, Boston, Mass., assignors to The Glenn L. Martin Company, Middle River, Md., a corporation of Maryland Application June 29, 1950, Serial No. 170,992

3 Claims. (Cl. 267—8)

This invention relates to a drag strut for use in conjunction with an aircraft landing gear and more particularly to a double-acting hydraulic type shock absorber.

Landing gear drag loads resulting from ground contact during the wheel "spin-up" interval cause landing gears to deflect in an aft direction. In the majority of aircraft gear installations this after deflection produces binding in the main oleo and momentarily delays vertical shock absorption. When the gear reaches its maximum aft deflection, it recoils or springs forward due to the energy stored in the landing gear and its related reaction structure. This aft and forward oscillation of the gear continues during the landing roll until all of the energy stored in the landing gear and reaction structure is dissipated. The stresses induced by such oscillations cause premature "fatigue" or work hardening of the metal, resulting in failures upon application of forces far less than the forces to which the gear is normally subjected. This condition can develop almost instantaneously, making it impossible to predict the probable occurrence of a failure in the gear.

Shock absorbing devices of various types have been used in drag links on the landing gear of aircraft for the purpose of controlling the deflections in the fore and aft directions and eliminating the oscillations which cause the metal to work harden. The hydraulic type shock absorber is widely accepted as the most desirable for resisting aircraft landing loads because of the superior damping action obtainable through a fluid medium. The high shock loads which must be absorbed make it necessary for the shock absorber to operate efficiently. If the fluid within the cylinder chamber does not maintain a certain predetermined volume, the damping action of the shock absorber is materially hampered. This change in fluid volume, commonly caused by leakage or by temperature effects, will permit continued oscillations with greater fore and aft deflections of the landing gear than were anticipated in the design, resulting in a structure no more able to withstand dynamic loads than would be a landing gear without the use of shock absorbing and oscillation damping means in the drag link.

An object of this invention is to provide a double-acting hydraulic type shock absorber, capable of damping out oscillations originating from dynamic loads.

Another object of this invention is to provide a shock absorbing drag strut for aircraft landing gear which will eliminate premature structural failures caused by uncontrolled vibrations.

Another object of this invention is to provide a double-acting hydraulic type shock absorber having a self-contained fluid reservoir which will automatically compensate for fluid losses.

Further and other objects will become apparent from the accompanying description and drawings which form a part of this disclosure and in which like numerals refer to like parts.

In the drawing:

Figure 2 is a detailed view of the shock absorber of this invention.

Figure 3 is a detailed view of a modified form of the shock absorber of this invention.

Figure 1:
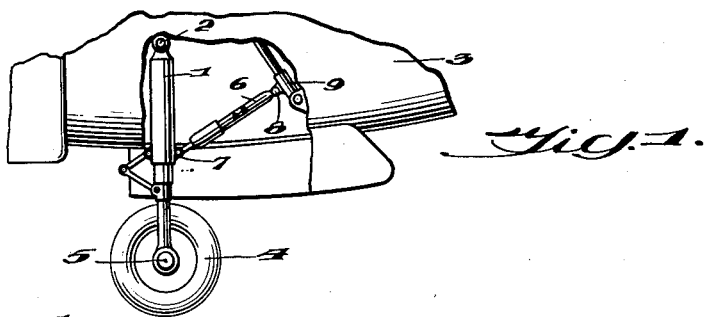
Figure 1 shows a typical retractable landing gear carried by a portion of an aircraft, illustrating the relative positions of the various components.
Figure 4:
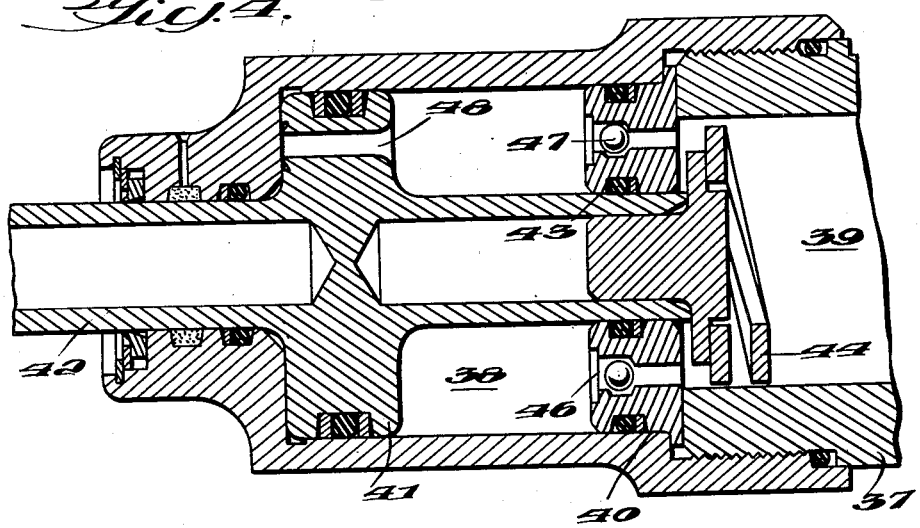
Figure 4 is an enlarged view showing the piston chamber section of the shock absorber of Figure 3.
Figure 5:
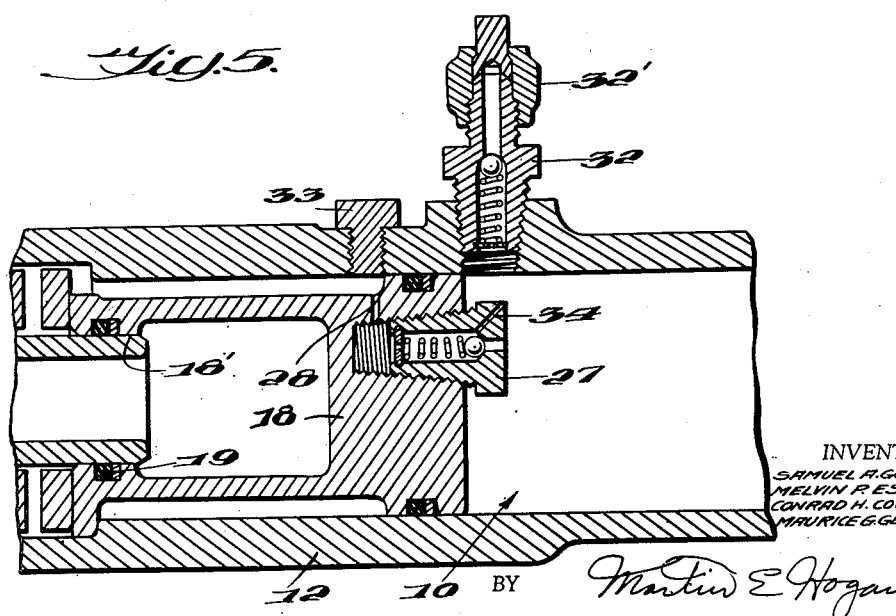
Figure 5 is an enlarged view showing a portion of the shock absorber of Figure 2 in the area between the piston chamber and the reservoir chamber.

Main oleo 1 is pinned at 2 to a portion of aircraft 3 as shown in Figure 1, and provides vertical shock absorption for the aircraft upon ground contact by wheel 4 pivotally mounted at 5 on the lower end of main oleo 1. Drag link 6 is pinned at 7 on one end to main oleo 1 adjacent wheel 4 and pinned at 8 at its other end to the retracting mechanism 9 of aircraft 3. By operation of retracting mechanism 9, main oleo 1 pivots about pin 2 to move the gear from its extended position, rearwardly and upwardly into the body of the aircraft to a retracted position.

Drag link 6 is more descriptively referred to as a double-acting hydraulic type shock absorber. As shown in Figure 2, shock absorber 6 includes a reservoir chamber 10 and a piston chamber 11, both enclosed within tubular housing 12. An aperture 13 at one end of piston chamber 11 is adapted to receive rod 14. A piston 15, formed integral with rod 14, slidably engages wall 16 of piston chamber 11 for limited axial movement. Seal 17, carried by piston 15 effects a fluid-tight relationship between piston 15 and the piston chamber wall 16. Partition assembly 18 fixedly carried within housing 12 and arranged transversely of its axis, separates reservoir chamber 10 and piston chamber 11. Rod 14 extends axially beyond piston 15 and is slidably received in a bore 18' extending part way through the partition assembly 18, a seal 19 being provided therein to insure fluid tight engagement with rod 14. Rod 14 and piston 15 displace a constant volume within piston chamber 11 irrespective of their axial position due to the fact that the diameter of rod 14 is the same on either side of piston 15. Spacer 21 seats against piston 15 and circumferentially engages rod 14. Compression spring 20, within piston chamber 11, butts against partition assembly 18 on one end and against spacer 21 at its opposite end, and is so designed as to apply a force on piston 15 tending to maintain it in the fully extended position under static load conditions.

Piston chamber 11 is filled with fluid to resist the dynamic loads tending to cause oscillatory telescopic movement of rod 14 and piston 15 with respect to housing 12. A limited amount of telescopic movement is desirable to effectively absorb the shock loads, and to obtain that desired amount of movement without continued oscillations, orificed member 22 is fitted into an aperture formed in piston 15 to permit the controlled flow of fluid therethrough upon axial movement of rod 14 and piston 15. When rod 14 and piston 15 are moved axially and inwardly, fluid which has passed through orifice 22 to the opposite side of piston 15, dampens the return of rod 14 and piston 15 to the fully extended position.

To permit shock absorber 6 to be disassembled, housing 12 includes a removable head section 23 which includes the portion of piston chamber 11 engaging piston 15. Seal 24 prevents fluid leakage at the threaded joint 35 between head section 23 and the remaining portion of housing 12. To effect fluid tight engagement between head 23 and rod 14 at aperture 13, head 23 of housing 12 is provided with seal 25. Bearing 26 in head 23, engaging axially movable rod 14 at aperture 13, is a hard wearing material for increasing the life of shock absorber 6 without making it necessary to employ the inherently heavier metal throughout head 23.

Fluid-tight reservoir chamber 10 in housing 12 contains a reserve supply of fluid to compensate for any loss of fluid within piston chamber 11. A check valve 27, seated in partition assembly 18 permits unidirectional flow of fluid from reservoir chamber 10 into piston chamber 11 by means of passageway 28. A very small opening 34 interconnecting piston chamber 11 and reservoir chamber 10 provides a passage for fluid from the cylinder chamber to compensate for increases in fluid volume due to temperature changes.

To insure positive performance of reservoir chamber 10, piston 29 slidably engages the wall thereof and maintains the fluid in the chamber under a certain desired pressure. Seal 30 accomplishes fluid tight engagement between the walls of reservoir chamber 10 and piston 29. The pressure which is exerted upon the fluid by piston 29 is obtained by use of spring 31 which rests at one end against the piston and at the other end against housing 12.

Reservoir chamber 10 may be filled through filler valve 32, which is of the check-valve type to prevent the fluid within the chamber from escaping therethrough upon application of pressure. Any fluid which might leak by the valve is stopped by the removable cap 32'.

When shock absorber 6 is initially filled with fluid, or possibly for some other reason, air will be locked in the piston and reservoir chambers, seriously affecting the action of the substantially incompressible hydraulic fluid. To provide an escape passage for removing the air locked within shock absorber 6, an opening through housing 12 into port 28 is shown in Figure 2. This opening is closed by bleed plug 33, which is removed only at such times as is necessary to bleed the air from within the chambers.

Shock absorber 6, when installed as a drag link between the landing gear main oleo 1 and the supporting structure on aircraft 3, absorbs the fore and aft deflections of the gear by telescopic movement of rod 14 and piston 15 within piston chamber 11. This initial piston motion, starting from the fully extended position is controlled by orifice 22, which meters flow of fluid in the piston chamber 11 from one side of piston 15 to the other for optimum energy absorption. Upon reaching maximum compressive deflection, the gear attempts to spring back to its initial position, actuated partly by the energy stored in compression spring 20 of shock absorber 6. This stroke is damped by returning the oil through the piston orifice 22. A different rate of damping is usually required for the return motion and may be attained by using different contours at opposite ends of orifice 22. Absorption of the initial or "spin-up" drag impact energy in the drag strut without repeated oscillations reduces the binding tendency of the main oleo, resulting in more efficient vertical shock absorption. This reduction in the number of stress reversals occurring in the gear and supporting structure per dynamic loading greatly increases the life of the gear.

When the volume of fluid in piston chamber 11 varies from the predetermined volume, or synonymously when the pressure in piston chamber 11 is less than the pressure in reservoir chamber 11 fluid stored in reservoir chamber 10 passes through valve 27 to restore the loss of fluid in the piston chamber. If the fluid should happen to increase in volume due to temperature increases, opening 34 will permit fluid to flow from piston chamber 11 into reservoir chamber 10. Since the changes in fluid volume due to temperature changes are very slight, the size of opening 34 is made sufficiently small as to not affect the damping action of the shock absorber. By maintaining the proper volume of fluid in piston chamber 11, as provided for in this invention, the hydraulic type shock absorber will always function properly.

An indicator rod 36 carried by piston 29 extends into a cut-out portion in housing 12, as shown in Figure 2, for indicating the quantity of fluid in reservoir chamber 10. Indicator 36 may be observed at regular inspection periods to determine whether or not fluid should be added to the reservoir chamber.

The invention may be illustrated equally as well by the shock absorber shown in Figure 3, which is a modification of the one shown in Figure 2. Tubular housing 37 is divided into a piston chamber 38 and a reservoir chamber 39 by partition 40 secured transversely within the housing. A piston 41 is slidably carried within piston chamber 38 for limited axial movement. Piston rod 42, formed integral with piston 41, extends on either side thereof. One end of rod 42 extends axially beyond housing 37. The other end of rod 42 slidably engages an aperture 43 in partition 40, and extends axially therethrough and into reservoir chamber 39. Sealing means are employed to render piston chamber 38 fluid tight. Spring 44 carried within reservoir chamber 39 butts against the portion of rod 42 extending through partition 10, and tends to maintain piston 41 in an extreme axial position to fully extend the rod. Spacer 45, held in fixed axial position within reservoir chamber 39 butts against spring 44 to limit its movement to that of compressive deflections which are induced by axial movement of rod 42. By employing spacers of different lengths spring 44 may be pre-loaded as desired for resisting static forces before deflecting. Two check valves 46 and 47 in partition 40 allow fluid to flow from reservoir chamber 39 to piston chamber 38 automatically when the pressure in the piston chamber is less than the pressure in the reservoir chamber. An orifice 43 formed in piston 41 permits restricted flow of fluid on either side thereof within piston chamber 38. Rod 42, being of the same cross-sectional area on either side of piston 41, has a constant displacement volume irrespective of the axial position of the piston. A small vent opening 49 in housing 37 admits air into reservoir chamber 39 at atmospheric pressure to act against fluid stored therein.

This modification shown in Figure 3 is more economical to manufacture than is the shock absorber shown in Figure 2. Its operation is basically the same as that already described. In either design, the shock absorber of this invention is entirely self-contained. The proper amount of fluid is maintained in the working chamber without the use of bulky, inefficient hydraulic supply lines running from some exterior source. Any loss of fluid in the working chamber caused by imperfect sealing, by high instantaneous pressures or for any other reason, is automatically replenished by fluid stored in the reservoir chamber formed within the housing of the shock absorber.

It is to be understood that certain changes, alerations, modifications and substitutions can be made without departing from the spirit and scope of the appended claims.

We claim as our invention:

1. A self-contained fluid type shock absorber having a tubular housing, a transverse partition within said housing forming a piston chamber and a reservoir chamber in axial alignment therewith, valve means carried by said partition for allowing unidirectional flow of fluid from said reservoir chamber to said piston chamber, said valve being automatically operable by the occurrence of a pressure differential between said chambers, a piston adapted for limited axial movement within said piston chamber, an aperture formed in said piston for allowing restricted flow of fluid therethrough, a piston rod carried by said piston and extending on either side thereof, one end of said rod being adapted for sliding engagement with said partition and the other end protruding axially beyond said housing, said housing being so vented to atmosphere that both ends of said rod have atmospheric pressure acting thereagainst, the portion of said rod extending within said piston chamber having a substantially constant cross-sectional area, thereby resulting in a substantially constant displacement volume irrespective of the axial position of said piston, and a compression spring acting between said housing and said piston and tending to maintain said piston in an extreme axial position in said piston chamber to fully extend said rod.

2. A self-contained fluid type shock absorber having a tubular housing, a transverse partition within said housing forming a piston chamber and a reservoir chamber in axial alignment therewith, valve means carried by said partition for allowing unidirectional flow of fluid from said reservoir chamber to said piston chamber, said valve being automatically operable by the occurrence of a pressure differential between said chambers, a piston adapted for limited axial movement within said piston chamber, an aperture formed in said piston for allowing restricted flow of fluid therethrough, a piston rod carried by said piston and extending on either side thereof, said partition having an axial bore therein in fluid communication with the exterior of said housing, one end of said rod being adapted for sliding engagement with said partition bore and the other end protruding axially beyond said housing, the portion of said rod extending within said piston chamber having a substantially constant cross-sectional area, thereby resulting in a substantially constant displacement volume irrespective of the axial position of said piston, a spring carried within said piston chamber and arranged concentrically about said piston rod for urging said piston to an extreme position, said reservoir chamber having a second piston slidable therein and forming a movable end wall thereof, and spring means urging said second piston against the fluid in said reservoir so as to maintain a positive pressure thereon at all times for urging fluid into said piston chamber irrespective of the position of said shock absorber relative to the force of gravity.

3. A self-contained fluid type shock absorber having a tubular housing, a transverse partition within said housing forming a piston chamber and a reservoir chamber in axial alignment therewith, valve means carried by said partition for allowing unidirectional flow of fluid from said reservoir chamber to said piston chamber, said valve being automatically operable by the occurrence of a pressure differential between said chambers, a piston adapted for limited axial movement within said piston chamber, an aperture formed in said piston for allowing restricted flow of fluid therethrough, a piston rod carried by said piston and extending on either side thereof, one end extending through said partition and into said reservoir chamber, the other end protruding axially beyond said housing, the portion of said rod extending within said piston chamber having a substantially constant cross-sectional area, thereby resulting in a substantially constant displacement volume irrespective of the axial position of said piston, and a compression spring carried within said reservoir chamber and adapted to engage said piston rod for urging it to an extreme axial position, said housing being provided with a vent connecting the reservoir chamber directly to atmosphere adjacent the end thereof remote from said piston chamber.

SAMUEL A. GORDON.
MELVIN P. ESPY.
CONRAD H. COOKE.
MAURICE G. GERTEL.

References Cited in the file of this patent

UNITED STATES PATENTS

| Number | Name | Date |
|---|---|---|
| 1,761,747 | Rosin et al. | June 3, 1930 |
| 2,106,886 | Chisholm | Feb. 1, 1938 |
| 2,404,111 | Underwood | July 16, 1946 |
| 2,436,573 | Heynes | Feb. 24, 1948 |
| 2,462,844 | Chalfaut et al. | Mar. 1, 1949 |
| 2,481,150 | Pifer | Sept. 6, 1949 |
| 2,531,368 | Tack et al. | Nov. 21, 1950 |

FOREIGN PATENTS

| Number | Country | Date |
|---|---|---|
| 531,168 | Great Britain | Dec. 31, 1940 |
| 654,039 | France | Nov. 20, 1928 |
| 943,152 | France | Sept. 27, 1948 |

(Corresponding British patent) 652,698, May 2, 1951.